United States Patent
Wilhelm et al.

(10) Patent No.: US 8,302,767 B2
(45) Date of Patent: Nov. 6, 2012

(54) BOTTLING OR CONTAINER FILLING MACHINE AND OTHER ROTARY BOTTLE OR CONTAINER HANDLING MACHINES IN A BOTTLING OR CONTAINER FILLING PLANT AND A DRIVE THEREFOR

(75) Inventors: Lothar Wilhelm, Karben (DE); Uwe Wolf, Bad Kreuznach (DE); Christian Albrecht, Suhl (DE); Günter Schmid, Nürnberg (DE)

(73) Assignee: KHS GmbH, Dortmund (DE)

( * ) Notice: Subject to any disclaimer, the term of this patent is extended or adjusted under 35 U.S.C. 154(b) by 495 days.

(21) Appl. No.: 12/372,981

(22) Filed: Feb. 18, 2009

(65) Prior Publication Data

US 2010/0037988 A1 Feb. 18, 2010

Related U.S. Application Data

(63) Continuation-in-part of application No. PCT/EP2007/007226, filed on Aug. 16, 2007.

(30) Foreign Application Priority Data

Aug. 19, 2006 (DE) .......................... 10 2006 039 090

(51) Int. Cl.
*H02K 41/03* (2006.01)
(52) U.S. Cl. ........ 198/805; 141/129; 141/144; 141/145; 141/250; 141/DIG. 1
(58) Field of Classification Search .................. 141/129, 141/144, 145, 250, 268, DIG. 1; 198/805, 198/470.1, 478.1, 619
See application file for complete search history.

(56) References Cited

U.S. PATENT DOCUMENTS

| 3,792,296 A | 2/1974 | Lefebvre |
| 2003/0041916 A1* | 3/2003 | Kohashi et al. .................. 141/83 |
| 2004/0061383 A1 | 4/2004 | Tsuboi et al. |

FOREIGN PATENT DOCUMENTS

| DE | 264 413 | 2/1989 |
| DE | 44 14 768 | 11/1995 |
| DE | 44 24 077 | 1/1996 |
| DE | 203 01 532 | 4/2003 |
| DE | 103 04 030 | 9/2004 |
| DE | 20 2006 00369 | 6/2006 |

(Continued)

OTHER PUBLICATIONS

International Search Report PCT/EP2007/007226 and English translation thereof.
International Search Report PCT/EP2007/007226 and English translation thereof mailed Jan. 30, 2008.

*Primary Examiner* — Timothy L Maust
*Assistant Examiner* — Timothy Kelly
(74) *Attorney, Agent, or Firm* — Nils H. Ljungman & Associates

(57) ABSTRACT

A rotary container handling machine which has a stationary frame and a turntable supported thereby, which turntable has container handling devices for handling containers. The turntable is rotated by a drive. The drive comprises an encircling collar with a plurality of magnets, and at least one stator which overlaps one subsector of the collar to permit rotation of the turntable by an electromagnetic field generated by the at least one stator. The collar is disposed on either the stationary frame or the turntable, while the at least one stator is disposed on the other.

20 Claims, 3 Drawing Sheets

FOREIGN PATENT DOCUMENTS

| | | |
|---|---|---|
| DE | 20 2006 003690 | 6/2006 |
| JP | 63-105484 U | 7/1988 |
| JP | 2002-345224 A | 11/2002 |
| JP | 2005-160275 A | 6/2005 |
| JP | 2006-211806 A | 8/2006 |
| WO | WO 2005-068301 A1 | 7/2005 |

* cited by examiner

BOTTLING OR CONTAINER FILLING MACHINE AND OTHER ROTARY BOTTLE OR CONTAINER HANDLING MACHINES IN A BOTTLING OR CONTAINER FILLING PLANT AND A DRIVE THEREFOR

CONTINUING APPLICATION DATA

This application is a Continuation-In-Part application of International Patent Application No. PCT/EP2007/007226, filed on Aug. 16, 2007, which claims priority from Federal Republic of Germany Patent Application No. 10 2006 039 090.3, filed on Aug. 19, 2006. International Patent Application No. PCT/EP2007/007226 was pending as of the filing date of this application. The United States was an elected state in International Patent Application No. PCT/EP2007/007226.

BACKGROUND

1. Technical Field

The present application relates to a bottling or container filling machine and other rotary bottle or container handling machines in a bottling or container filling plant and a drive therefor, and further to a drive for rotary machines having a stationary and a rotating component.

2. Background Information

Background information is for informational purposes only and does not necessarily admit that subsequently mentioned information and publications are prior art.

A beverage bottling plant for filling bottles with a liquid beverage filling material can possibly comprise a beverage filling machine, which is often a rotary filling machine, with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material.

Some beverage bottling plants may possibly comprise filling arrangements that receive a liquid beverage material from a toroidal or annular vessel, in which a supply of liquid beverage material is stored under pressure by a gas. The toroidal vessel may also be connected to at least one external reservoir or supply of liquid beverage material by a conduit or supply line. In some circumstances it may even be possible that a beverage bottling plant has two external supply reservoirs, each of which may be configured to store either the same liquid beverage product or different products. These reservoirs could possibly be connected to the toroidal or annular vessel by corresponding supply lines, conduits, or other arrangements. It is also possible that the external supply reservoirs could be in the form of simple storage tanks, or in the form of liquid beverage product mixers.

A wide variety of types of filling elements are used in filling machines in beverage bottling or container filling plants for dispensing a liquid product into bottles, cans or similar containers, including but not limited to filling processes that are carried out under counterpressure for the bottling of carbonated beverages. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine.

After a filling process has been completed, the filled beverage bottles are transported or conveyed to a closing machine, which is often a rotary closing machine. A revolving or rotary machine comprises a rotor, which revolves around a central, vertical machine axis. There may further be provided a conveyer arrangement configured to transfer filled bottles from the filling machine to the closing station. A transporting or conveying arrangement can utilize transport star wheels as well as linear conveyors. A closing machine closes bottles by applying a closure, such as a screw-top cap or a bottle cork, to a corresponding bottle mouth. Closed bottles are then usually conveyed to an information adding arrangement, wherein information, such as a product name or a manufacturer's information or logo, is applied to a bottle. A closing station and information adding arrangement may be connected by a corresponding conveyer arrangement. Bottles are then sorted and packaged for shipment out of the plant.

Many beverage bottling plants may also possibly comprise a rinsing arrangement or rinsing station to which new, non-return and/or even return bottles are fed, prior to being filled, by a conveyer arrangement, which can be a linear conveyor or a combination of a linear conveyor and a starwheel. Downstream of the rinsing arrangement or rinsing station, in the direction of travel, rinsed bottles are then transported to the beverage filling machine by a second conveyer arrangement that is formed, for example, by one or more starwheels that introduce bottles into the beverage filling machine.

It is a further possibility that a beverage bottling plant for filling bottles with a liquid beverage filling material can be controlled by a central control arrangement, which could be, for example, a computerized control system that monitors and controls the operation of the various stations and mechanisms of the beverage bottling plant.

Such rotary machines are used as container handling machines, for example, with which medicine or beverage containers such as bottles, cans or similar containers are cleaned, filled and labeled. The containers move around turntables of various sizes during handling. These turntables can be of substantial dimensions as a function of system size and purpose. They must or should be able to withstand high speeds yet permit precise or general speed control, for example to compensate for capacity fluctuations.

Such rotary machines are typically driven by means of a servomotor, which via a gearbox moves a pinion that engages in gearing on the rotating machine component and turns said component.

Disadvantageous here is the complicated configuration of the overall configuration because of the need or desire for a gearbox, which must or should work very precisely or generally to satisfy the requirements described above and thus must or should be very complex in design. This also increases the susceptibility of the entire system to faults and requires or desires regular maintenance. Because such systems are frequently operated in conjunction with large quantities of liquids, the entire configuration must or should be encapsulated to be watertight, which further increases the complexity.

OBJECT OR OBJECTS

An object of the present application is to create a drive for the described rotary machines that has a simpler and more cost-effective design yet maintains the same open and closed-loop control precision while simultaneously or substantially simultaneously being less susceptible to wear and faults.

SUMMARY

The present application achieves this with a drive having the characteristic features disclosed as a drive for rotary machines having a stationary and a rotating machine component, wherein on one machine element there is an encircling collar with a plurality of magnets. On the other machine component is at least one corresponding stator that overlaps one subsector of the collar so that the rotating machine component can be moved in a defined direction of rotation by an electromagnetic field generated by the stator.

A drive of this design completely eliminates the need or desire for a servomotor with a gearbox. Instead a collar with permanent magnets or electromagnets placed in regular intervals is arranged at the rotating machine component, for example at the location where the gearing was arranged previously. Arranged opposite to this on the stationary component of the machine is an electromagnetic stator, such as is used in a modified form in linear electric drives. The stator is bent and its radius is matched to the radius of the magnetic collar. The stator overlaps only a subsector of the rotating magnetic collar and/or a portion of a subsector of the rotating magnetic color. On the inside of the stator is a coil configuration, which enables a tangential force to be exerted against the opposing magnets, setting these together with the entire rotating component of the machine into motion. The size of the stator as well as the number and configuration of the internal coils is a function of the size and the required or desired forces and speeds. The moments generated and the resulting speeds can be controlled precisely or generally and independently as a function of the parameters of the field generated by the coils, such as field strength and field frequency.

It is possible to arrange multiple such stators around the magnetic collar if appropriate due to the large maximum forces required or desired, for example.

Depending on the configuration of the machine, it is also possible to arrange the magnets on the inside of a circular collar and place the stator within this collar, the shape of which is then adapted to this configuration.

In one embodiment the corresponding drive is combined with a ball bearing rotary connector that bears the rotating component of the machine. Here the magnets can be arranged on the outside circumference of the rotating component of the ball bearing rotary connector and the stator arranged correspondingly on the stationary component of the rotary connector.

The drive according to the present application is significantly smaller and more compact, and completely eliminates the need or desire for a gearbox. Furthermore, it comprises no moving parts other then the rotating machine component and is mounted in an area of the machine that is usually dry, so that it is not exposed to liquids or cleaning agents, which significantly reduces the fault susceptibility and maintenance intensity of the overall system.

A measuring device, such as in the form of an optical angular position sensor on the shaft, is provided to monitor the position and/or speed of the rotating machine component.

These and other embodiments of the present application are disclosed according to the present application, which are described below.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail below with reference to the attached drawings, in which.

DESCRIPTION OF EMBODIMENT OR EMBODIMENTS

Figure 1:
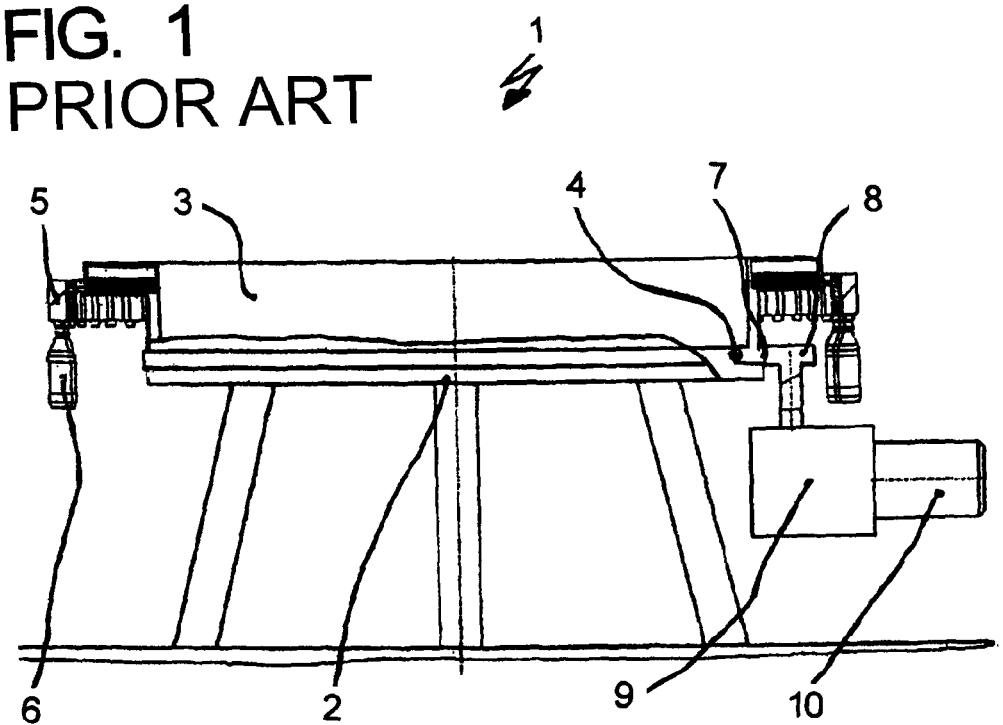
FIG. 1 shows a schematic side view of a rotary machine of the prior art.

A rotary machine of the prior art, designated as a whole with 1, is shown in detail in FIG. 1. It has a stationary machine component 2 and a rotating machine component 3, which are connected together by means of a ball bearing rotary connector. Arranged on the outside of the rotating component are filling stations 5, with which beverage bottles 6 are filled with product.

Arranged on the outside of the ball bearing rotary connector 4 connected to the rotating machine component 3 is gearing 7, in which a pinion 8 driven by a servomotor 10 via a gearbox 9 engages. The rotation component of the machine is driven and its speed controlled by supplying an appropriate current to the servomotor 10.

Figure 2:
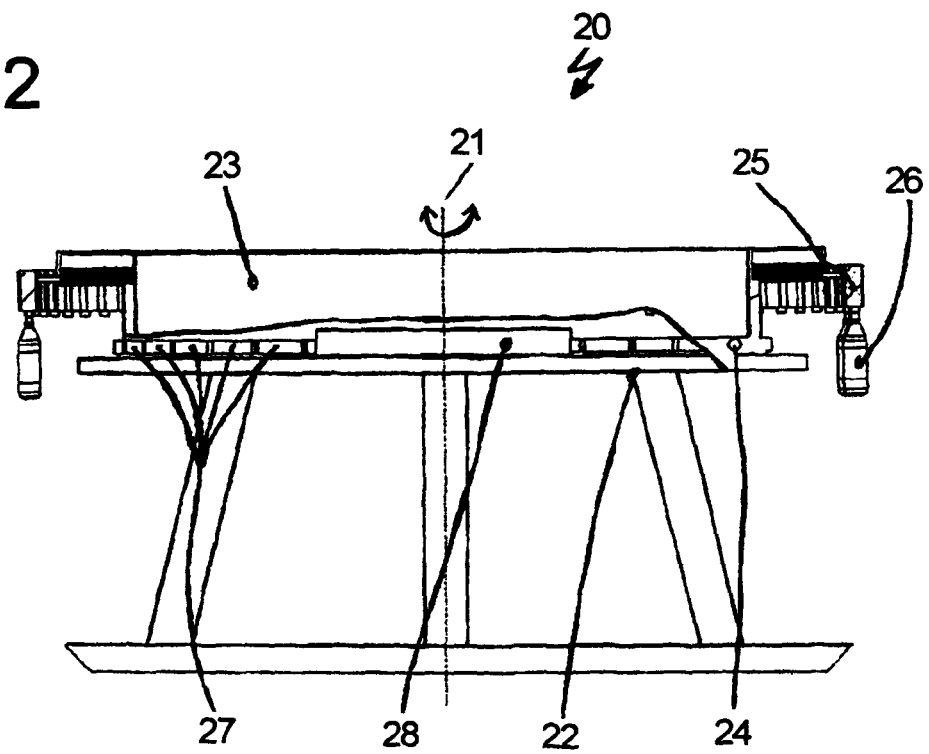
FIG. 2 shows a partial sectional side view of a rotary machine with the drive according to the present application.

The drive according to the present application is shown in detail in FIG. 2. Here, too, the container handling machine, designated as a whole with 20, has a stationary machine component 22 and a rotating machine component 23 that can be rotated around a center shaft 21. There is a ball bearing rotary connector 24 that bears and connects the rotating machine component 23 to the stationary machine component 22. Here again are filling stations 25 on the rotating component 23 of the container handling machine 20, which serve to fill bottles 26 with beverages.

Permanent magnets 27 are arranged at regular intervals on the outside of the rotating part of the ball bearing rotary connector 24. In one possible embodiment of the present application, electromagnets are used in place of the permanent magnets 27. An electromagnetic stator 28 is arranged outside of and circumferential to the ball bearing rotary connector 24 and overlaps one angle sector of the connector. The stator 28 comprises a coil arrangement which enables the generation of an alternating electromagnetic field. This is controlled by a control unit not shown in greater detail here.

Figure 3:
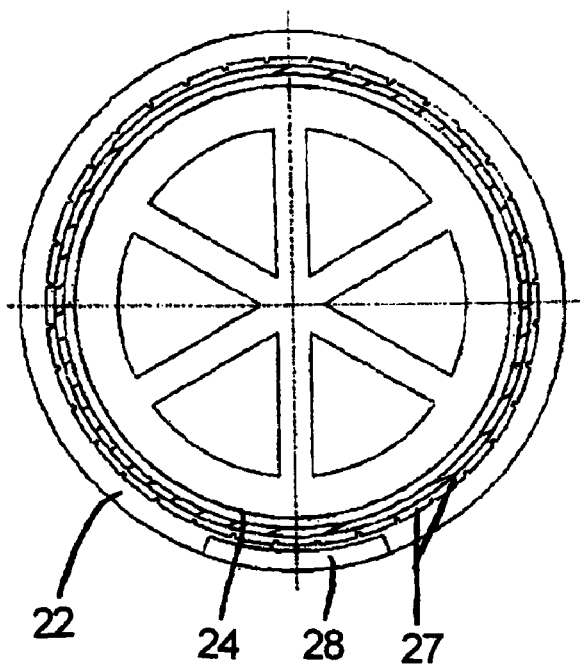
FIG. 3 shows a schematic plan view of a first embodiment of the drive according to the present application.

To turn the configuration, another view of which is shown in FIG. 3, the stator generates 28 generates a magnetic field that exerts a tangential force on the magnets 27 within its area, so that these are displaced clockwise, for example, which due to the rotary configuration results in rotation of the rotating component 23. The desired torque and the desired speed can be matched to requirements as a function of the strength and frequency of the electromagnetic field, thus enabling a controlled startup or shutdown of the system.

By means of an appropriately configured control unit, the residual rotational energy in the system can be used to generate energy by switching the stator to a generator coil configuration, for example to supply the system with sufficient energy for a controlled shutdown in the event of a complete loss of power.

In the embodiments described herein, the drive arrangement for rotating the rotor and the bottle or container handling elements connected thereto could be a synchronous motor or an asynchronous motor. The rotor in an alternating current (AC) drive arrangement could be a squirrel-cage rotor, a slip ring rotor, or a solid rotor, each of which could be utilized in place of or as a substitute for the permanent magnets 27. The field windings could be disposed on either the rotor or stator, and the squirrel-cage rotor or slip ring rotor could be disposed on the other of the rotor or stator on which the field windings are positioned. In at least one possible embodiment, the AC motor could be either a three-phase or other polyphase motor.

Figure 4:
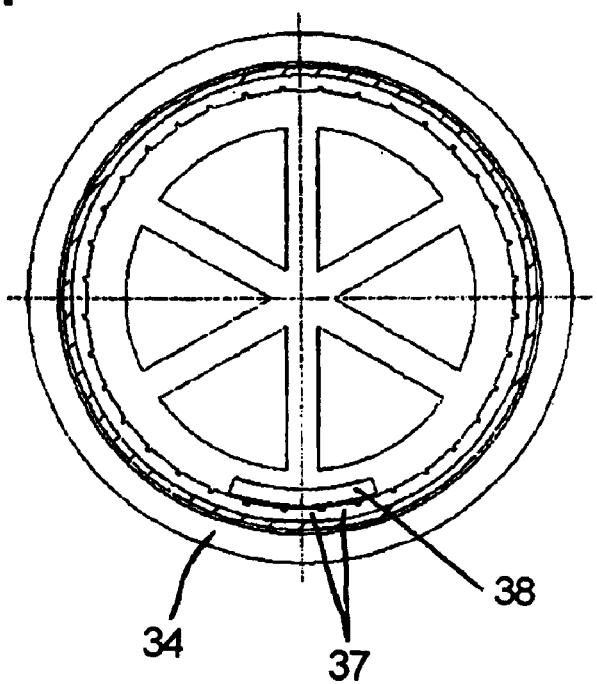
FIG. 4 shows a schematic plan view of a second embodiment of the drive according to the present application.

An alternative embodiment is shown in detail in FIG. 4. A collar 34, which is rigidly connected to the rotating component of a corresponding rotary machine not shown in greater detail, has a plurality of magnets 37 on its inside circumference. Arranged opposite is a stator 38, whose coils are arranged on its outside circumference and thus, analogous to the process described above, enable the machine to be set into rotation.

Figure 5:
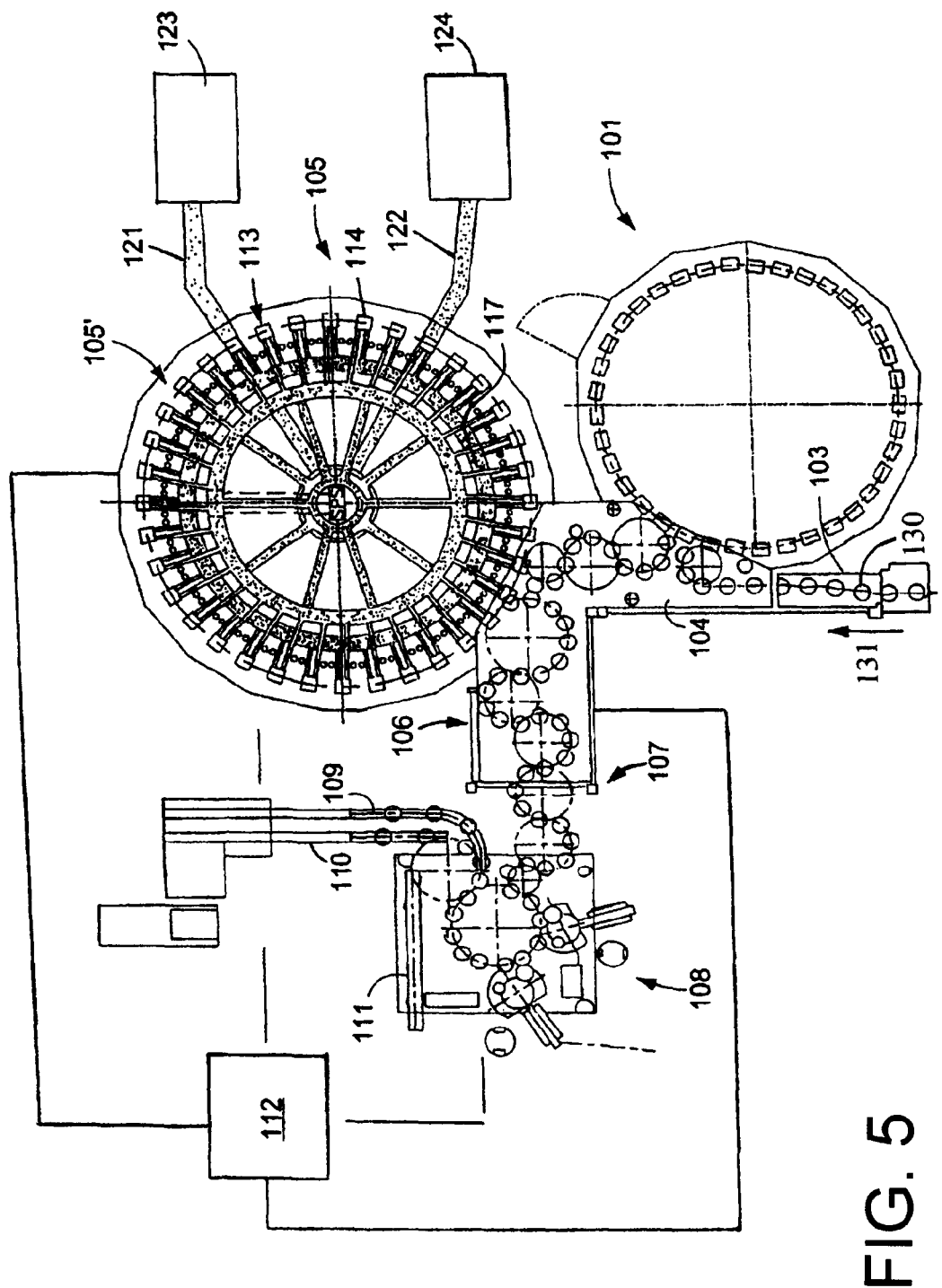
FIG. 5 shows schematically the main components of one possible embodiment example of a system for filling containers.

FIG. 5 shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 5 shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 5, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The present application is not restricted to the possible embodiments above and can be modified in numerous ways without straying from the basic principle. The exact or general configurations of the rotary machines are therefore not specified. The number and arrangement of the magnets is also widely variable, in one possible embodiment as a function of the size and the forces and speeds to be generated. More than one stator can also be used.

A drive for rotary machines with a stationary and a rotating machine component is to be refined so that it has a simpler and more cost-effective design yet maintains the same open and closed-loop control precision while simultaneously or substantially simultaneously being less susceptible to wear and faults. This is achieved in that an encircling collar with a plurality of magnets 27, 37 is provided on one machine element and that on the other machine component is at least one corresponding stator 28, 38 that overlaps one subsector of the collar so that the rotating machine component 23 can be moved in a defined direction of rotation by an electromagnetic field generated by the stator 28, 38.

One feature or aspect of an embodiment is believed at the time of the filing of this patent application to possibly reside broadly in a drive for rotary machines having a stationary and a rotating machine component, wherein on one machine element there is an encircling collar with a plurality of magnets 27, 37 and that on the other machine component is at least one corresponding stator 28, 38 that overlaps one subsector of the collar so that the rotating machine component 23 can be moved in a defined direction of rotation by an electromagnetic field generated by the stator 28, 38.

Another feature or aspect of an embodiment is believed at the time of the filing of this patent application to possibly reside broadly in the drive, wherein the magnets 27, 37 are located on the rotating 23 and the at least one stator 28, 38 is located on the stationary machine component 22.

Yet another feature or aspect of an embodiment is believed at the time of the filing of this patent application to possibly reside broadly in the drive, wherein the collar with the magnets 27 is located on the outside circumference of a section of the rotating machine component 23 and the stator 28 is arranged outside the section.

Still another feature or aspect of an embodiment is believed at the time of the filing of this patent application to possibly reside broadly in the drive, wherein the collar with the magnets 37 is located on the inside circumference of a section of the rotating machine component 23 and the stator 38 is arranged inside the section.

A further feature or aspect of an embodiment is believed at the time of the filing of this patent application to possibly reside broadly in the drive, wherein the drive is configured in combination with a ball bearing rotary connector 24.

Another feature or aspect of an embodiment is believed at the time of the filing of this patent application to possibly reside broadly in the drive, wherein the magnets 27 are arranged on the rotating part of the ball bearing rotary connector 24.

Yet another feature or aspect of an embodiment is believed at the time of the filing of this patent application to possibly reside broadly in the drive, wherein there is a measuring device for determining the position and/or speed of the rotating machine component 23.

Still another feature or aspect of an embodiment is believed at the time of the filing of this patent application to possibly reside broadly in the drive, wherein the drive is configured for use with container handling machines.

Yet another feature or aspect of an embodiment is believed at the time of the filing of this patent application to possibly reside broadly in a rotary beverage bottle filling machine for filling beverage bottles with a liquid beverage in a bottling plant, said filling machine comprising: a rotor; a vertical central shaft; said rotor being connected to said vertical central shaft and being configured to rotate about said vertical central shaft; a plurality of beverage bottle filling elements being disposed on the periphery of said rotor; each of said filling elements comprising a bottle carrier being configured and disposed to receive and hold bottles to be filled; each of said filling elements being configured and disposed to dispense liquid into bottles held by said bottle carriers; at least one liquid reservoir being configured to hold a supply of liquid beverage; said at least one liquid reservoir being operatively connected to said filling elements to supply liquid beverage thereto; a first star wheel structure being configured and disposed to move bottles into said bottle filling machine; a second star wheel structure being configured and disposed to move bottles out of said bottle filling machine; a stationary portion being disposed adjacent and to overlap a section of a portion of said rotor; and one of said rotor portion and said stationary portion comprises a coil arrangement being configured to generate a rotating field configured to act upon the other of said rotor portion and said stationary portion to produce rotational movement of said rotor portion.

A further feature or aspect of an embodiment is believed at the time of the filing of this patent application to possibly reside broadly in rotary container handling machine for handling containers, said container handling machine comprising: a rotor; a vertical central shaft; said rotor being connected to said vertical central shaft and being configured to rotate about said vertical central shaft; a plurality of container handling elements being disposed on the periphery of said rotor; an input arrangement being configured to move containers to said rotor; an output arrangement being configured to move containers from said rotor; a stationary portion being disposed adjacent and to overlap a portion of said rotor; and one of said rotor portion and said stationary portion comprises a coil arrangement being configured to generate a rotating field configured to act upon the other of said rotor portion and said stationary portion to produce rotational movement of said rotor portion.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Jan. 30, 2008, and/or cited elsewhere are hereby incorporated by reference as if set forth in their entirety herein as follows: DE 203 01 532, having the following English translation of the German title "ELECTRIC MOTOR ROTARY DEVICE E.G. FOR COMPUTER TOMOGRAPHY, HAS A SECTOR-SHAPED STATOR WITH ENDS FACING ROTOR WITH INCREASING DISTANCE FROM ROTOR STARTING FROM CURVED INSIDE OF STATOR PARALLEL TO OUTSIDE OF ROTOR," published on Apr. 3, 2003; U.S. Pat. No. 3,792,296, having the title "AUTOMOTIVE STRUCTURE FOR REVOLVING STANDS," published on Feb. 12, 1974; US 2004/061383, having the title "POSITION-CONTROL STAGE WITH ONBOARD LINEAR MOTOR," published on Apr. 1, 2004; DE 44 24 077, having the German title "VORRICHTUNG ZUM TRANSPORTIEREN VON GEGENSTÄNDEN," published on Jan. 18, 1996; and DE 20 2006 003 690, having the German title "DIE FOLGENDEN ANGABEN SIND DEN VOM ANMELDER EINGEREICHTEN UNTERLAGEN ENTONOMMEN," published on Jun. 14, 2006.

The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 039 090.3, filed on Aug. 19, 2006, having inventors Lothar WILHELM and Uwe WOLF, and DE-OS 10 2006 039 090.3 and DE-PS 10 2006 039 090.3, and International Application No. PCT/EP2007/007226, filed on Aug. 16, 2007, having WIPO Publication No. WO2008/022737 and inventors Lothar WILHELM and Uwe WOLF, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/007226 and German Patent Application 10 2006 039 090.3 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/007226 and DE 10 2006 039 090.3 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Rotary machine
2 Stationary machine component
3 Rotating machine component
4 Ball bearing rotary connector
5 Filling station
6 Beverage bottles
7 Gearing
8 Pinion
9 Gearbox
10 Servomotor
20 Container handling machine
21 Center shaft
22 Stationary machine component
23 Rotating machine component
24 Ball bearing rotary connector
25 Filling station
26 Bottles
27 Permanent magnets
28 Stator
34 Collar
37 Magnets
38 Stator

What is claimed is:

1. A rotary container handling machine comprising:
a stationary frame and a turntable supported thereby;
said turntable comprising container handling devices;
a drive being configured to rotate said turntable;
said drive comprising: an encircling collar with a plurality of magnets, and at least one stator being disposed to overlap one subsector of said collar to permit rotation of said turntable by an electromagnetic field generated by said at least one stator; and
said collar being disposed on one of: said stationary frame and said turntable, and said at least one stator being disposed on the other of said stationary frame and said turntable.

2. The rotary container handling machine according to claim 1, wherein said magnets are disposed on said turntable, and said at least one stator is disposed on said stationary frame.

3. The rotary container handling machine according to claim 2, wherein said collar is disposed on the outside circumference of a section of said turntable and said at least one stator is disposed outside the section.

4. The rotary container handling machine according to claim 2, wherein said collar is disposed on the inside circumference of a section of said turntable and said at least one stator is disposed inside the section.

5. The rotary container handling machine according to claim 4, wherein said drive is configured in combination with a ball bearing rotary connector.

6. The rotary container handling machine according to claim 5, wherein said collar forms the rotating part of said ball bearing rotary connector.

7. The rotary container handling machine according to claim 6, wherein said rotary container handling machine comprises a measuring device for determining at least one of: the position and speed of said turntable.

8. The rotary container handling machine according to claim 7, wherein said rotary container handling machine comprises one of: a container filling machine, a container closing machine, a container cleaning machine, and a container labeling machine.

9. The rotary container handling machine according to claim 3, wherein said drive is in combination with a ball bearing rotary connector.

10. The rotary container handling machine according to claim 9, wherein said collar forms the rotating part of said ball bearing rotary connector.

11. The rotary container handling machine according to claim 10, wherein said rotary container handling machine comprises a measuring device for determining at least one of: the position and speed of said turntable.

12. The rotary container handling machine according to claim 11, wherein said rotary container handling machine comprises one of: a container filling machine, a container closing machine, a container cleaning machine, and a container labeling machine.

13. The rotary container handling machine according to claim 1, wherein said rotary container handling machine comprises one of: a container filling machine, a container closing machine, a container cleaning machine, and a container labeling machine.

14. The rotary container handling machine according to claim 1, wherein said rotary container handling machine comprises a container filling machine.

15. The rotary container handling machine according to claim 14, wherein said container filling machine comprises a bottle filling machine.

16. The rotary container handling machine according to claim 1, wherein said turntable is disposed on said stationary frame in a horizontal orientation and has a vertical axis of rotation.

17. The rotary container handling machine according to claim 16, wherein said drive is in combination with a ball bearing rotary connector.

18. The rotary container handling machine according to claim 17, wherein said ball bearing rotary connector is disposed between said turntable and said stationary frame, and is configured to support said turntable.

19. The rotary container handling machine according to claim 16, wherein said container handling devices are disposed radially further away from said vertical axis of rotation than said drive, such that all portions of said drive are disposed within and a radial distance away from the path of transport of containers being handled by said container handling devices.

20. The rotary container handling machine according to claim 1, wherein no portion of said drive is disposed beneath any one of said container handling devices in a vertical direction.

* * * * *